US012627780B2

(12) United States Patent
Ou et al.

(10) Patent No.: US 12,627,780 B2
(45) Date of Patent: May 12, 2026

(54) METHOD FOR ADJUSTING PROJECTION BOUNDARY AND PROJECTION SYSTEM

(71) Applicant: Coretronic Corporation, Hsin-Chu (TW)

(72) Inventors: Chia-Yen Ou, Hsin-Chu (TW); Hsun-Cheng Tu, Hsin-Chu (TW); Chien-Chun Peng, Hsin-Chu (TW); Kang-Shun Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 100 days.

(21) Appl. No.: 18/470,424

(22) Filed: Sep. 20, 2023

(65) Prior Publication Data

US 2024/0106996 A1 Mar. 28, 2024

(30) Foreign Application Priority Data

Sep. 23, 2022 (CN) .......................... 202211163843.4

(51) Int. Cl.
*H04N 9/31* (2006.01)
*G06T 7/13* (2017.01)

(52) U.S. Cl.
CPC ............. *H04N 9/3185* (2013.01); *G06T 7/13* (2017.01)

(58) Field of Classification Search
CPC .. H04N 9/3147; H04N 9/3194; H04N 9/3185; H04N 9/3179; G06T 7/60; G06T 2207/20212; G06T 2207/20221; G06T 3/40; G06T 5/80; G06T 7/13
See application file for complete search history.

(56) References Cited

U.S. PATENT DOCUMENTS

2017/0223320 A1* 8/2017 Hiranuma ............ H04N 9/3185
2018/0143008 A1* 5/2018 Morrison ........... G01B 11/2504
2019/0238807 A1 8/2019 Furui
(Continued)

FOREIGN PATENT DOCUMENTS

CN 104853127 8/2015
CN 109005394 12/2018

OTHER PUBLICATIONS

"Office Action of Great Britain Counterpart Application", issued on Feb. 26, 2024, pp. 1-4.

*Primary Examiner* — John W Miller
*Assistant Examiner* — Humam M Satti
(74) *Attorney, Agent, or Firm* — JCIPRNET

(57) ABSTRACT

A method for adjusting a projection boundary and a projection system are provided. Multiple imaging apparatuses corresponding to multiple projection apparatuses are driven, and each imaging apparatus obtains a corresponding captured image by capturing projected image projected by corresponding one projection apparatus and surrounding area of the projected image. All captured images are displayed on a display, and a main bounding box corresponding to each projected image and a reference bounding box corresponding to the surrounding area are displayed on each captured image. The main bounding box of each captured image is independently adjusted relative to the reference bounding box to obtain an adjusted main bounding box. A full image boundary is calculated based on the respective adjusted main bounding boxes. The projection apparatuses are driven to project an adjusted full image based on the full image boundary.

16 Claims, 9 Drawing Sheets

(56)                     References Cited

U.S. PATENT DOCUMENTS

2020/0134798  A1      4/2020  Cian et al.
2021/0127096  A1*     4/2021  Lin ...................... H04N 9/3194
2022/0262287  A1      8/2022  Zhong et al.
2024/0146884  A1*     5/2024  Matsumoto .......... H04N 9/3185

* cited by examiner 900 ($A_{max}$)

910

930

920

940

METHOD FOR ADJUSTING PROJECTION BOUNDARY AND PROJECTION SYSTEM

CROSS-REFERENCE TO RELATED APPLICATION

This application claims the priority benefit of China application serial no. 202211163843.4, filed on Sep. 23, 2022. The entirety of the above-mentioned patent application is hereby incorporated by reference herein and made a part of this specification.

BACKGROUND

Technical Field

The disclosure relates to a projection system and a projection method, and particularly relates to a method for adjusting a projection boundary and a projection system.

Description of Related Art

Projectors are constantly evolving for business, home or education applications, and it becomes more and more common to use multiple projectors to project at the same time to form a larger image. Generally speaking, in an automatic stitching process, the stitched projection area is defined by pre-boundary. It is a conventional approach to use a single camera for imaging with pre-boundary. Since a single camera does not involve multi-camera coordinate conversion which is required when multiple cameras are used, it is easy to define the projection range by using the pre-view function of the application. For example, the projection boundary of multiple projectors may be preset through the application, and then the projection areas are stitched based on the boundary.

Moreover, in the case of presetting the boundary for imaging with multiple cameras, in order to obtain a result similar to that obtained by each camera, the multiple images captured need to be stitched first to obtain a complete stitched image so as to define the boundary. Since the multiple cameras can only capture images within their respective ranges, the captured images shown on the interface of the application are not integral images. Therefore, in the conventional approach, it is necessary to perform image stitching on the application first for the user to know the final overall image, so that the boundary can be adjusted. Since it involves complex calculation to stitch images on the application, it usually takes more time (for example, 1 hour or longer), which is quite inconvenient for the user. Besides, when the boundary is adjusted with use of multiple cameras, the projection boundary may not be aligned due to the different perspectives of the cameras.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a method for adjusting a projected image and a projection system that are capable of adjusting a projection boundary as coordinate data for applying boundary setting in subsequent automatic image blending.

Other objectives and advantages of the disclosure can be further understood from the technical features described in the disclosure.

In order to achieve one or some or all of the above objectives or other objectives, a method for adjusting a projection boundary according to an embodiment of the disclosure is performed by a processor, and the method includes: driving a plurality of projection apparatuses to respectively project respective projected images on different positions of a projection surface to form a full image; in response to projecting the projected images on the projection surface, driving a plurality of imaging apparatuses corresponding to the projection apparatuses and using each of the imaging apparatuses to obtain a corresponding captured image by capturing the projected image projected by the corresponding one of the projection apparatuses and a surrounding area of the projected image, the surrounding area of the projected image including at least a part of another of the projected images projected by another of the projection apparatuses; displaying all captured images from the imaging apparatuses on a display, and respectively displaying a main bounding box corresponding to the projected image on each of the captured images and displaying a reference bounding box corresponding to at least a part of the another of the projected images in the surrounding area on each of the captured images; independently adjusting the main bounding box of each of the captured images relative to the reference bounding box to obtain an adjusted main bounding box corresponding to each of the captured images; calculating a full image boundary based on respective adjusted main bounding boxes of the captured images; and driving the projection apparatuses to project an adjusted full image based on the full image boundary.

A projection system according to an embodiment of the disclosure includes a plurality of projection apparatuses, a plurality of imaging apparatuses, a display, and a processor. The projection apparatuses are coupled to the processor, and the projection apparatuses are driven by the processor to respectively project respective projected images on different positions of a projection surface to form a full image. The imaging apparatuses are respectively disposed corresponding to the projection apparatuses and are coupled to the processor, and the imaging apparatuses are driven by the processor to enable each of the imaging apparatuses to obtain a corresponding captured image by capturing the projected image projected by corresponding one of the projection apparatus and a surrounding area of the projected image. The surrounding area of the projected image comprises at least a part of another of the projected images projected by another of the projection apparatuses. The display is coupled to the processor, and the processor receives all captured images from the imaging apparatuses and transmits the captured images to the display to display the captured images. The processor is configured to: respectively display a main bounding box corresponding to the projected image on each of the captured images and display a reference bounding box corresponding to at least a part of the another of the projected images in the surrounding area on each of the captured images; independently adjust the main bounding box of each of the captured images relative to the reference bounding box to obtain an adjusted main bounding box corresponding to each of the captured images; calculate a full image boundary based on respective adjusted main bounding boxes of the captured images; and drive the projection apparatuses to project an adjusted full image based on the full image boundary.

Based on the above, the disclosure independently adjusts the boundary of the projected image of the corresponding projection apparatus in the captured image captured by each imaging apparatus, which solves the problem that the boundary edges of the full image formed by multiple projected images of multiple projection apparatuses are not aligned and have discontinuous boundary lines.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
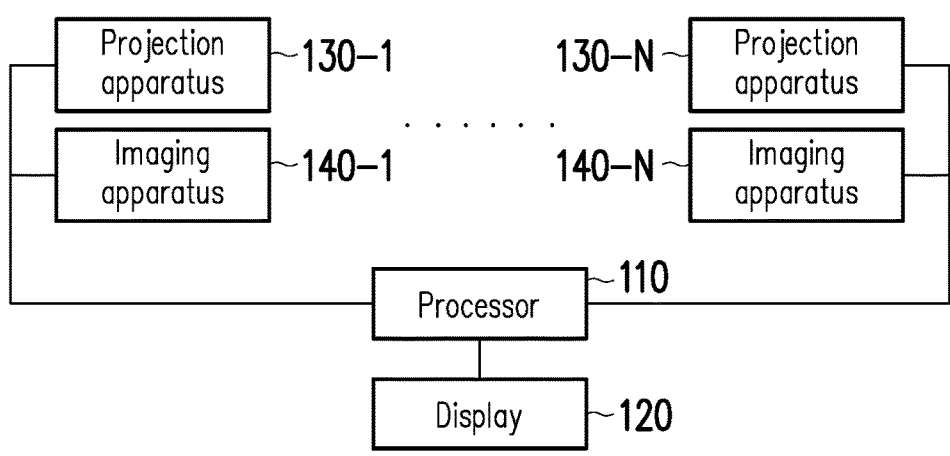
FIG. 1 is a block diagram of a projection system according to an embodiment of the disclosure.

FIG. 1 is a block diagram of a projection system according to an embodiment of the disclosure. Referring to FIG. 1, the projection system includes a processor 110, a display 120, a plurality of projection apparatuses 130-1 to 130-N, and a plurality of imaging apparatuses 140-1 to 140-N. The imaging apparatuses 140-1 to 140-N are correspondingly connected to the projection apparatuses 130-1 to 130-N, and the processor 110 is connected to the projection apparatuses 130-1 to 130-N and/or to the imaging apparatuses 140-1 to 140-N. That is, one imaging apparatus is disposed corresponding to one projection apparatus.

The imaging apparatuses 140-1 to 140-N may be video cameras, cameras, etc. that use charge coupled device (CCD) lenses and/or complementary metal oxide semiconductor transistor (CMOS) lenses.

The processor 110 is, for example, a central processing unit (CPU), a physics processing unit (PPU), a programmable microprocessor, an embedded control chip, a digital signal processor (DSP), an application specific integrated circuit (ASIC) or other similar devices. The processor 110 may drive the projection apparatuses 130-1 to 130-N to perform projection, and may drive the imaging apparatuses 140-1 to 140-N to capture images.

The display 120 is, for example, a liquid crystal display (LCD), a light-emitting diode (LED) display, a plasma display, a touch screen or the like.

In an embodiment, the processor 110 and the display 120 may be disposed in an independent electronic device, and may be coupled to the projection apparatuses 130-1 to 130-N and the imaging apparatuses 140-1 to 140-N in a wired or wireless manner. In addition, the electronic device further includes a storage device. For example, the storage device may be realized by any type of fixed or removable random access memory (RAM), read-only memory (ROM), flash memory, secure digital card, hard disk, other similar devices or a combination of these devices. At least one code fragment is stored in the storage device. After the code fragment is installed, the code fragment is executed by the processor 110.

Each of the projection apparatuses 130-1 to 130-N includes physical hardware components such as a control chip, an optical-mechanical module, a light source module, and a projection lens. The control chip is coupled to the optical-mechanical module and the light source module, and drives and controls them. The optical-mechanical module includes, for example, a digital micromirror device (DMD).

Here, the edge of the full image formed by each projected image or a smaller central rectangular or polygonal block is used to reset the projection boundary by an adjusting method similar to image warping, and after deforming and adjusting the boundary position, the projection image is re-projected. An embodiment will be described hereinafter.

Figure 2:
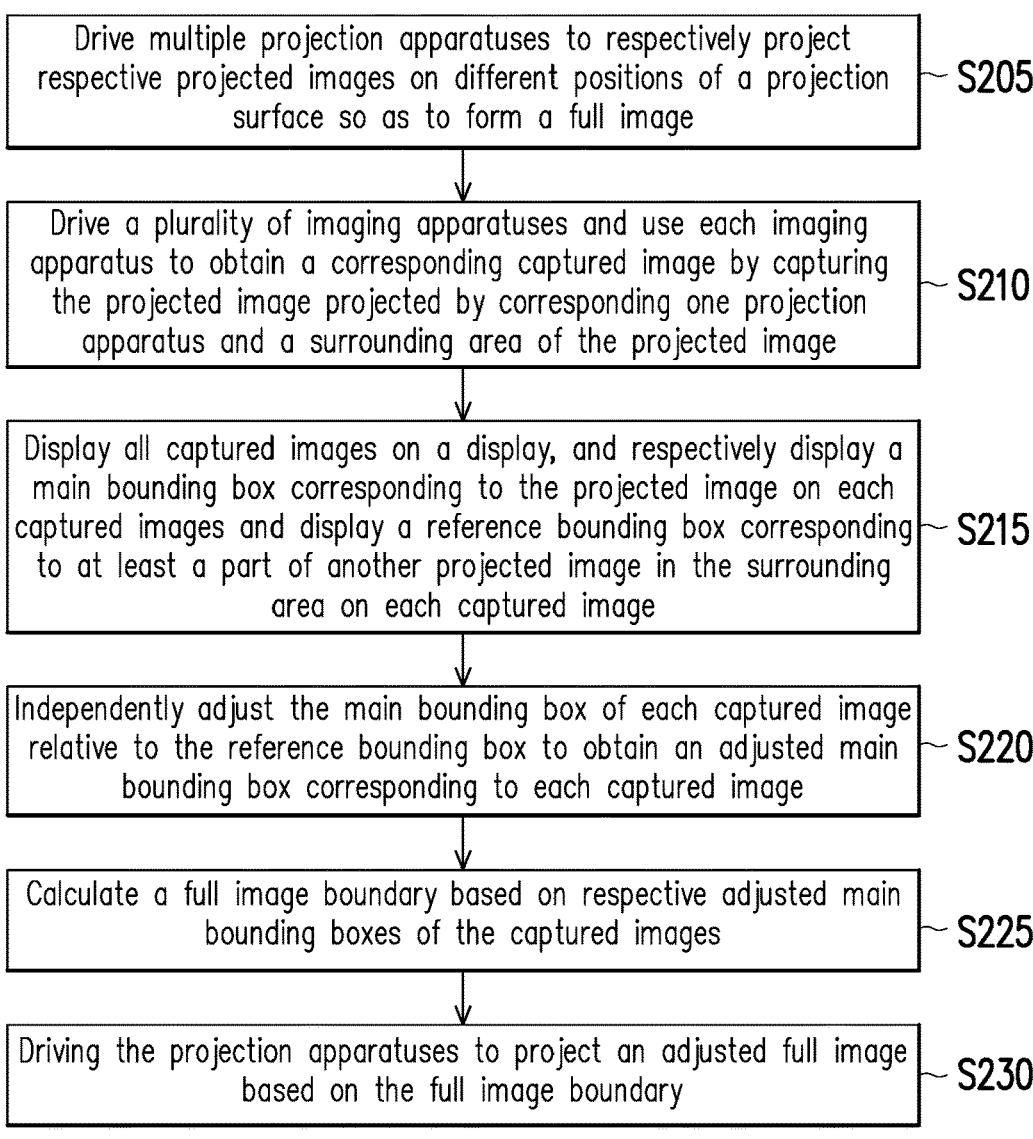
FIG. 2 is a flowchart of a method for adjusting a projection boundary according to an embodiment of the disclosure.

FIG. 2 is a flowchart of a method for adjusting a projection boundary according to an embodiment of the disclosure. Referring to FIG. 1 and FIG. 2, in step S205, the projection apparatuses 130-1 to 130-N are driven to project the respective projected images on different positions of a projection surface, so as to form a full image. The projection surface is, for example, a projection screen, a wall or other plane surfaces or curved surfaces suitable for presenting the projected images. The projected images projected by the projection apparatuses 130-1 to 130-N on the projection surface may collectively form a full image.

Figure 3:
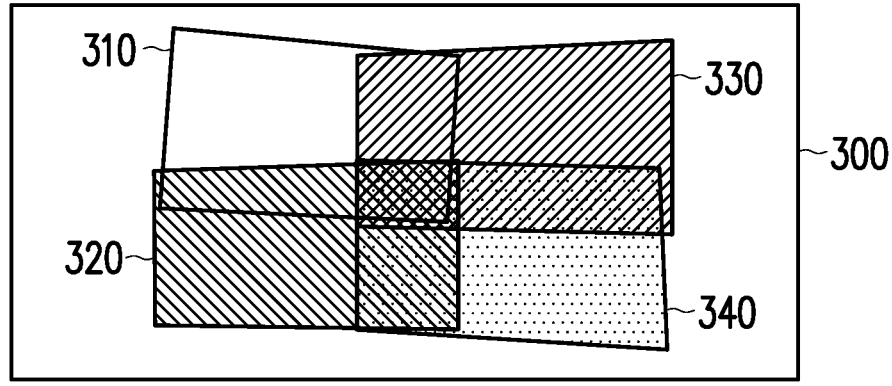
FIG. 3 is a schematic diagram of an application example of a projection system according to an embodiment of the disclosure.
Figure 3:
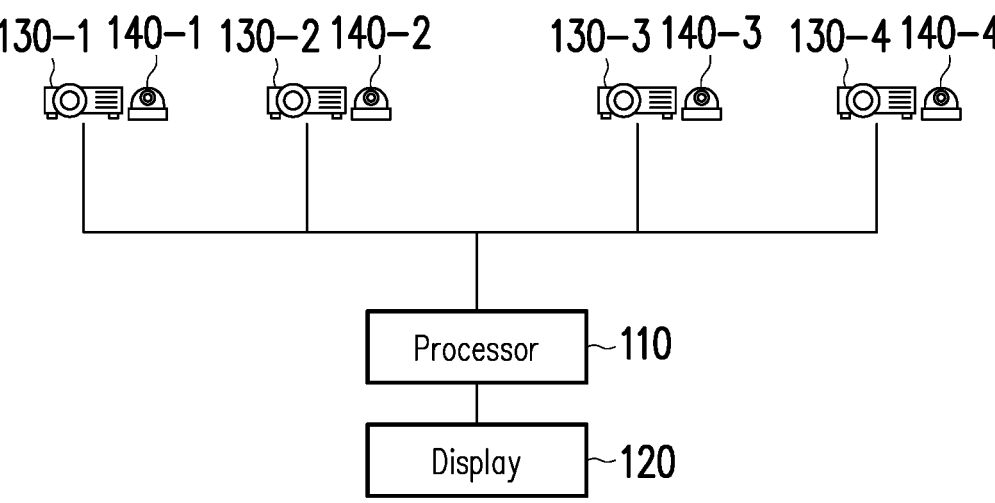

FIG. 3 is a schematic diagram of an application example of a projection system according to an embodiment of the disclosure. In this embodiment, four projection apparatuses 130-1 to 130-4 are used in combination with four imaging apparatuses 140-1 to 140-4 for description, but the disclosure is not limited thereto. The projection apparatuses 130-1 to 130-4 respectively project corresponding projected images 310 to 340 on different positions of the projection surface 300, and the projected images 310 to 340 together form a complete full image.

Next, in step S210, in response to projecting the projected images 310 to 340 on the projection surface 300, the processor 110 drives the imaging apparatuses 140-1 to 140-4 corresponding to the projection apparatuses 130-1 to 130-4, and uses each of the imaging apparatuses 140-1 to 140-4 to obtain a corresponding captured image (i.e. one imaging apparatus obtains one captured image) by capturing the projected images 310 to 340 projected by the projection apparatuses 130-1 to 130-4 and the surrounding areas of the projected images 310 to 340. The surrounding area of each of the projected images 310 to 340 includes at least a part of another projected image projected by at least another projection apparatus, and the at least a part of the another projected image and the projected image are adjacent with respect to a boundary of the full image formed together by the projected images.

In the embodiment shown in FIG. 3, the imaging apparatus 140-1 is used to perform the image capture on the projected image 310 of the projection apparatus 130-1 and the surrounding area of the projected image 310. The surrounding area of the projected image 310 includes parts of the projected images 320 to 340 that overlap (are adjacent to) the projected image 310. The imaging apparatus 140-2 is used to perform the image capture on the projected image 320 of the projection apparatus 130-2 and the surrounding area of the projected image 320, and the surrounding area of the projected image 320 includes parts of the projected images 310, 330, and 340 that overlap (are adjacent to) the projected image 320. The imaging apparatus 140-3 is used to perform the image capture on the projected image 330 of the projection apparatus 130-3 and the surrounding area of the projected image 330, and the surrounding area of the projected image 330 includes parts of the projected images 310, 320, and 340 that overlap (are adjacent to) the projected image 330. The imaging apparatus 140-4 is used to perform the image capture on the projected image 340 of the projection apparatus 130-4 and the surrounding area of the projected image 340, and the surrounding area of the projected image 340 includes parts of the projected images 310 to 330 that overlap (are adjacent to) the projected image 340. In other embodiments, the surrounding area of the projected image includes only at least a part of other projected images respectively projected by two projection apparatuses. The surrounding area of the projected image 310 may include only parts of the projected image 320 and the projected image 330 that overlap (are adjacent to) the projected image 310, the surrounding area of the projected image 320 includes parts of the projected image 310 and the projected image 340 that overlap (are adjacent to) the projected image 320, the surrounding area of the projected image 330 includes parts of the projected image 310 and the projected image 340 that overlap (are adjacent to) the projected image 330, and the surrounding area of the projected image 340 includes parts of the projected image 320 and the projected image 330 that overlap (are adjacent to) the projected image 320.

Thereafter, in step S215, all captured images (from the imaging apparatuses 140-1 to 140-4) are displayed on the display 120, and a main bounding box corresponding to the projected image is displayed on each of the captured images and a reference bounding box corresponding to at least a part of another projected image in the surrounding area is displayed on each of the captured images.

In step S220, the main bounding box of each captured image is independently adjusted relative to the reference bounding box to obtain an adjusted main bounding box corresponding to each captured image. In the following, the captured image obtained by the imaging apparatus 140-1 capturing the projected image 310 and the surrounding area thereof will be described as an example. The processor 110 adjusts at least one side of the main bounding box to align with at least one side of the reference bounding box in a manner that the main bounding box does not exceed a first projection boundary range corresponding to the projected image 310. The first projection boundary range is a boundary range in which the projected image 310 of the projection apparatus 130-1 is presented on the captured image. The projected image 310 is, for example, only a monochrome image, and the first projection boundary range is the boundary range of the monochrome image.

Further, in another embodiment, the processor 110 may directly use a second projection boundary range corresponding to the surrounding area of the projected image 310 as the reference bounding box. The processor 110 adjusts at least one side of the main bounding box to align with at least one side of the reference bounding box in a manner that the main bounding box does not exceed the first projection boundary range corresponding to the projected image 310. The second projection boundary range is a boundary range in which a part of the projected image of another projection apparatus is presented on the captured image (corresponding only to the boundary of the part of the projected image). The part of the projected image of the another projection apparatus is, for example, only a part of a monochrome image, and the second projection boundary range is the boundary range of the part of the monochrome image.

The captured image obtained by the imaging apparatus 140-1 will be described hereinafter as an example, which applies to the captured images obtained by the imaging apparatuses 140-2 to 140-4. In an embodiment, the captured image obtained by the imaging apparatus 140-1 is displayed on the display 120 by the processor 110. The processor 110 calculates the first projection boundary range in which the projected image 310 of the projection apparatus 130-1 is presented on the captured image, and then the display 120 displays the main bounding box within the first projection boundary range. Further, the processor 110 calculates the second projection boundary range corresponding to the surrounding area of the projected image 310, which is adjacent to the projected image 310, and the display 120 displays the reference bounding box within the second projection boundary range. In this embodiment, the surrounding area of the projected image 310 includes parts of the projected images 320 to 340. Therefore, the processor 110 calculates the respective projection boundary ranges (the second projection boundary ranges) for parts of the projected images 320 to 340, and displays the corresponding reference bounding boxes. In addition, the outer frame of the second projection boundary range may be directly used as the reference bounding box.

Figure 4:
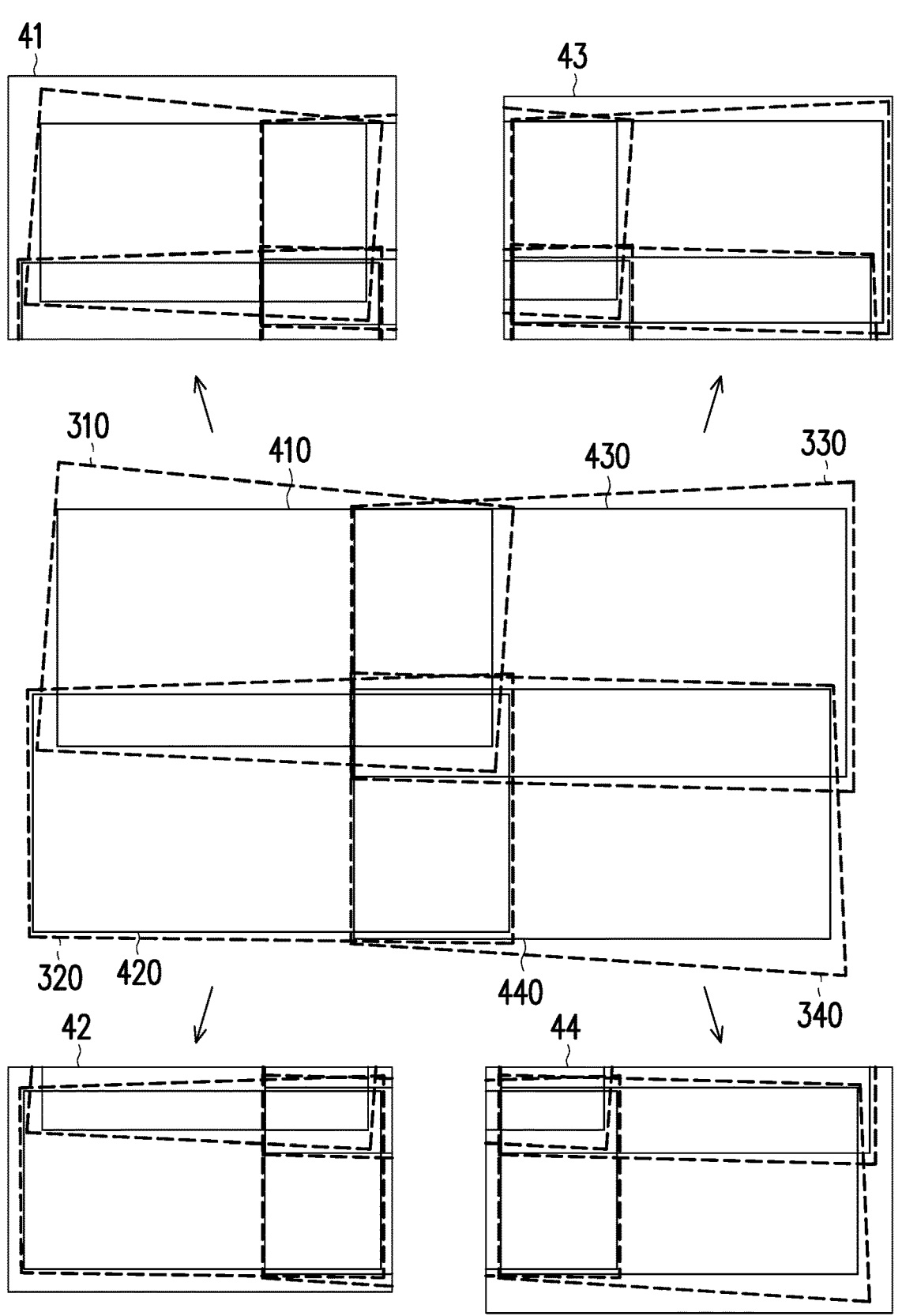
FIG. 4 is a schematic diagram of a projection state of each projection apparatus and a captured image thereof according to an embodiment of the disclosure.

In another embodiment, the projection apparatuses 130-1 to 130-4 may also project initial bounding boxes corresponding to the projected images 310 to 340 as the projection apparatuses 130-1 to 130-4 project the respective projected images 310 to 340 on different positions of the projection surface 300. For example, FIG. 4 is a schematic diagram of a projection state of each projection apparatus and a captured image thereof according to an embodiment of the disclosure. In the embodiment shown in FIG. 4, the processor 110 first drives the projection apparatuses 130-1 to 130-4 to respectively project the projected images 310 to 340 and the corresponding initial bounding boxes 410 to 440 on the projection surface 300. Then, the processor 110 respectively drives the imaging apparatuses 140-1 to 140-4 to capture images within the imaging ranges thereof so as to obtain captured images 41 to 44. Accordingly, each of the imaging apparatuses 140-1 to 140-4 performs the image capture on the initial bounding box projected within the imaging range thereof to present the main bounding box and the reference bounding box on each of the captured images 41 to 44. The processor 110 of FIG. 3 controls the display 120 to display the captured images 41 to 44 as shown in FIG. 4.

Figure 5A:
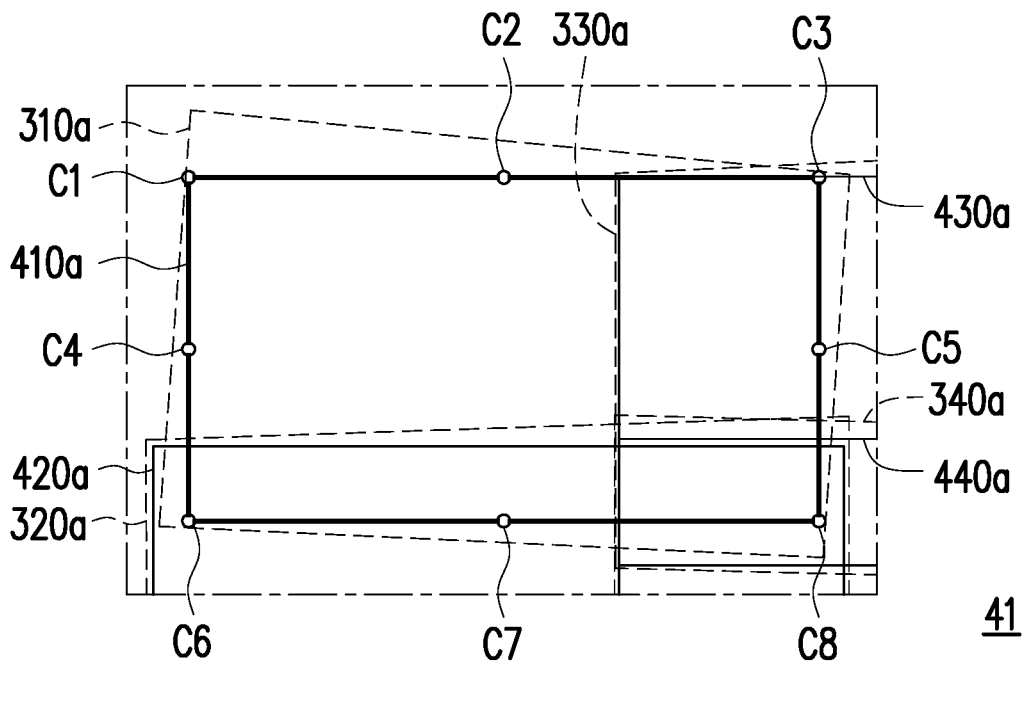
FIG. 5A is a schematic diagram of a captured image according to an embodiment of the disclosure.
Figure 5B:
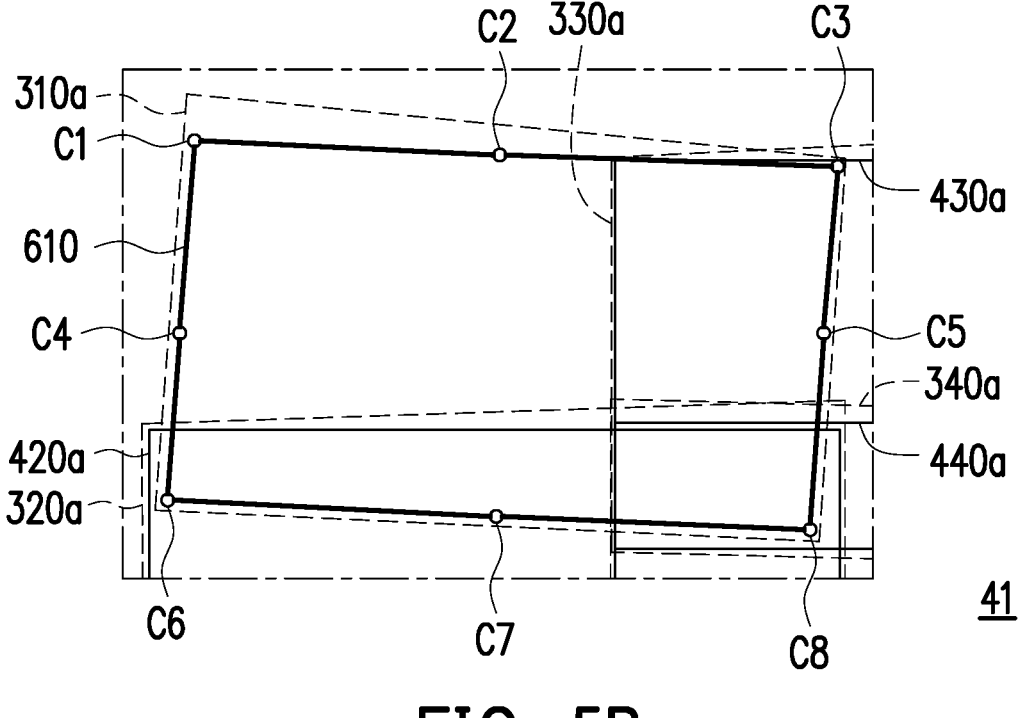
FIG. 5B is a schematic diagram of independently adjusting a main bounding box of a single captured image according to an embodiment of the disclosure.
Figures 6A, 6B, 6C, 6D:
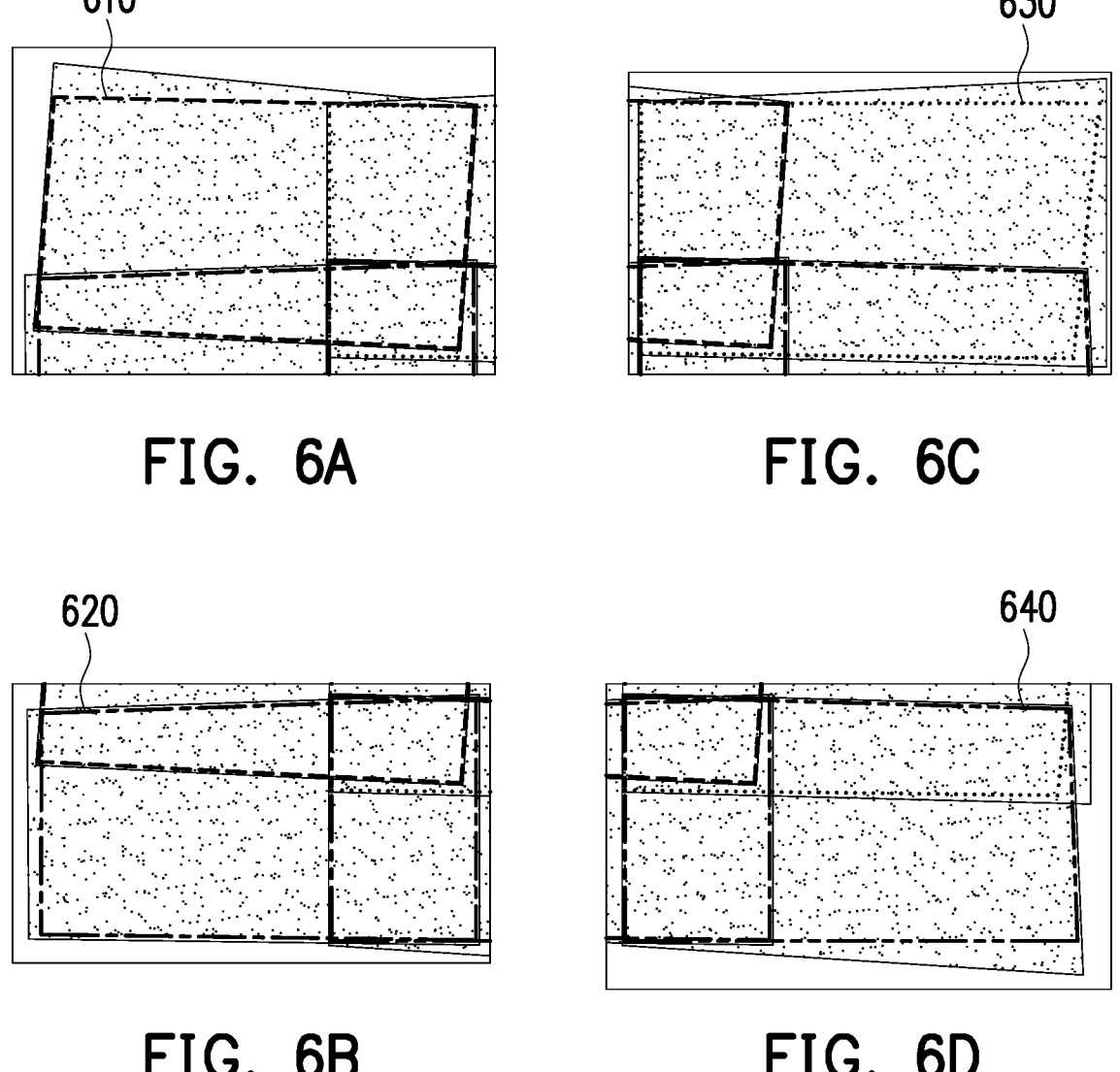
FIG. 6A to FIG. 6D are schematic diagrams of an adjusted main bounding box according to an embodiment of the disclosure.

The captured image 41 will be further described hereinafter as an example, which applies to the captured images 42 to 44. FIG. 5A is a schematic diagram of a captured image according to an embodiment of the disclosure. FIG. 5B is a schematic diagram of independently adjusting a main bounding box of a single captured image according to an embodiment of the disclosure. In this embodiment, the processor 110 as shown in FIG. 3 controls the display 120 to display the captured image 41, and provides a plurality of control points on the main bounding box 410a of the captured image 41 (for example, nine control points C1 to C8 are shown, but not limited thereto) so as to move at least one control point to adjust the main bounding box 410a (shown in FIG. 5A) and finally obtain an adjusted main bounding box 610 (shown in FIG. 5B). For example, at least one control point is moved onto the reference bounding box of the captured image.

Referring to FIG. 3, FIG. 5A, and FIG. 5B, the captured image 41 includes the first projection boundary range 310a corresponding to the projected image 310 (FIG. 4) and the second projection boundary ranges 320a, 330a, and 340a corresponding to the surrounding areas overlapping or adjacent to the projected image 310. The second projection boundary ranges 320a, 330a, and 340a respectively correspond to parts of the projected images 320, 330, and 340.

The processor 110 controls the display 120 to display the main bounding box 410a corresponding to the initial bounding box 410 within the first projection boundary range 310a, and display the reference bounding boxes 420a, 430a, and 440a corresponding to parts of the initial bounding boxes 420 to 440 within the second projection boundary ranges 320a, 330a, and 340a.

Taking the left side of the main bounding box 410a (the side formed by the control points C1, C4, and C6) as an example, the user adjusts the control points C1, C4, and C6 through the display 120 to align with the left side of the reference bounding box 420a in a manner that the main bounding box 410a does not exceed the first projection boundary range 310a. Taking the upper side of the main bounding box 410a (the side formed by the control points C1, C2, and C3) as an example, the control points C1, C2, and C3 are adjusted to align with the upper side of the reference bounding box 430a in a manner that the main bounding box 410a does not exceed the first projection boundary range 310a. For example, the user moves the control point C3 onto the reference bounding box 430a through the display 120. The right side (the side formed by the control points C3, C5, and C8) and the lower side (the side formed by the control points C6, C7, and C8) of the main bounding box 410a are relatively adjusted based on the right side and the lower side of the first projection boundary range 310a.

That is, if the projected image corresponding to the main bounding box to be adjusted is located on the upper left side of the full image, the upper side of the main bounding box is relatively adjusted based on the reference bounding box corresponding to another projected image located on the upper side of the full image, and the left side of the main bounding box is relatively adjusted based on the reference bounding box corresponding to another projected image located on the left side of the full image. The right side and the lower side of the main bounding box are relatively adjusted based on the projection boundary range of the corresponding projected image.

In this embodiment, it is emphasized to align the boundary of the outermost frame, rather than align the boundary of the overlapping portion between the projected images. The upper (or lower) boundary of a projected image located on the upper (or lower) side is aligned with the upper (or lower) boundary of another projected image located on the upper (or lower) side. The left (or right) boundary of a projected image located on the left (or right) side is aligned with the left (or right) boundary of another projected image located on the left (or right) side. Of course, the allowable error range of the alignment can be set as desired, which means that the boundary of the outermost frame can be automatically calculated by software operation within the error range.

The main bounding boxes of the remaining captured images 42 to 44 can also be adjusted in the same manner as the above-mentioned adjustment of the control points of the captured image 41.

Figure 7:
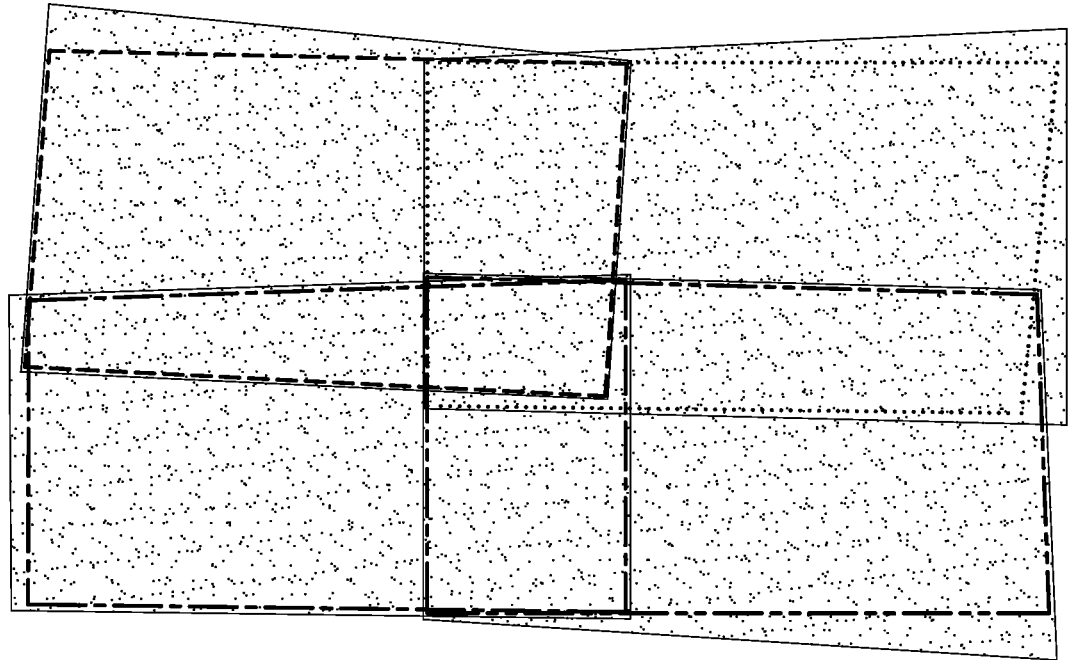
FIG. 7 is a schematic diagram of the ranges of projected images and adjusted projected images based on FIG. 6A to FIG. 6D according to an embodiment of the disclosure.

FIG. 6A to FIG. 6D are schematic diagrams of an adjusted main bounding box according to an embodiment of the disclosure. FIG. 7 is a schematic diagram of a projection display based on the ranges of FIG. 6A to FIG. 6D according to an embodiment of the disclosure. FIG. 6A to FIG. 6D show adjusted main bounding boxes 610 to 640 obtained after independently adjusting the main bounding boxes of the captured images 41 to 44. The ranges drawn by the solid lines in FIG. 7 are the projected images initially projected by the projection apparatuses 130-1 to 130-4 (the projected images 310 to 340 as shown in FIG. 3). The ranges drawn by the dotted lines in FIG. 7 are the adjusted projected images obtained through projection performed by the projection apparatuses 130-1 to 130-4 respectively on the basis of the adjusted main bounding boxes 610 to 640.

After obtaining the adjusted main bounding boxes 610 to 640 of the captured images 41 to 44, in step S225, the processor 110 calculates the full image boundary based on the respective adjusted main bounding boxes of the captured images 41 to 44 of the imaging apparatuses (140-1 to 140-4). For example, the adjusted main bounding boxes of the captured images 41 to 44 of the imaging apparatuses 140-1 to 140-4 are calculated to obtain a minimum intersection area $A_{min}$, and the outer frame of the minimum intersection area is used as the full image boundary. Alternatively, the adjusted main bounding boxes of the captured images 41 to 44 of the imaging apparatuses 140-1 to 140-4 are calculated to obtain a maximum intersection area $A_{max}$, and the outer frame of the maximum intersection area is used as the full image boundary.

In addition, in step S230, the projection apparatuses 130-1 to 130-4 are driven to project an adjusted full image based on the full image boundary.

Figure 8A:
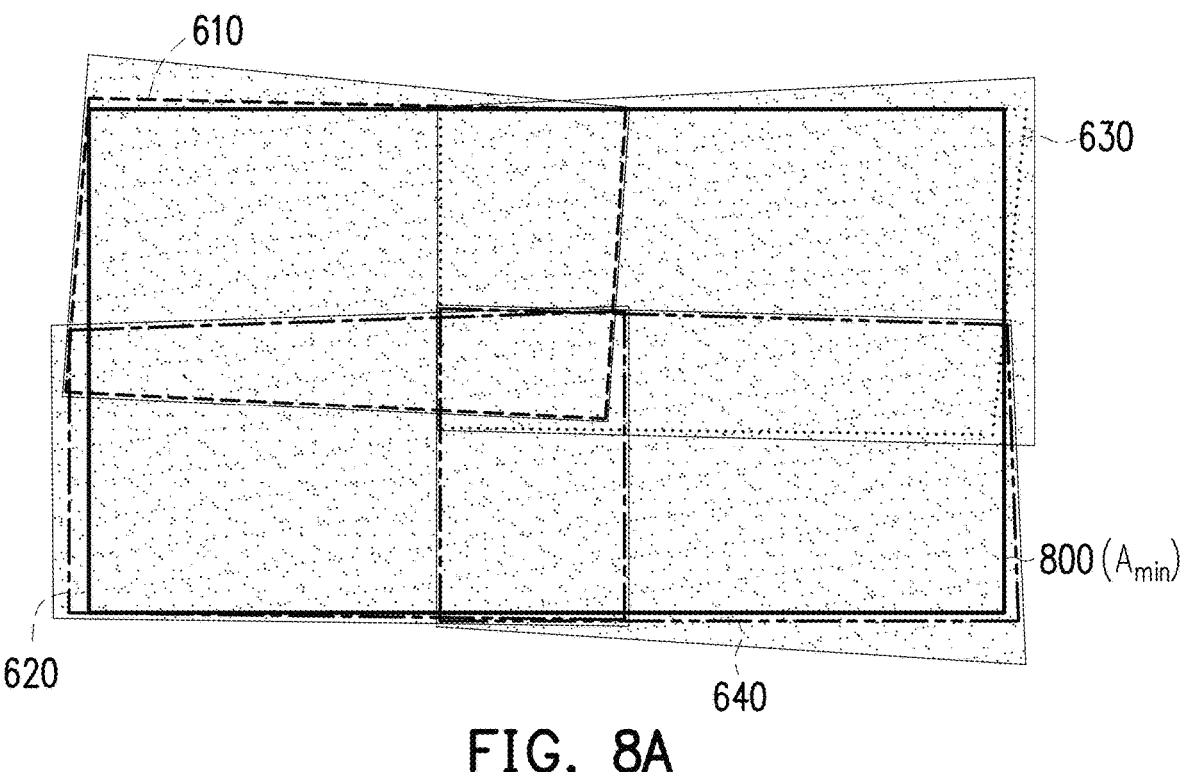
FIG. 8A is a schematic diagram of a full image boundary according to an embodiment of the disclosure.
Figure 8B:
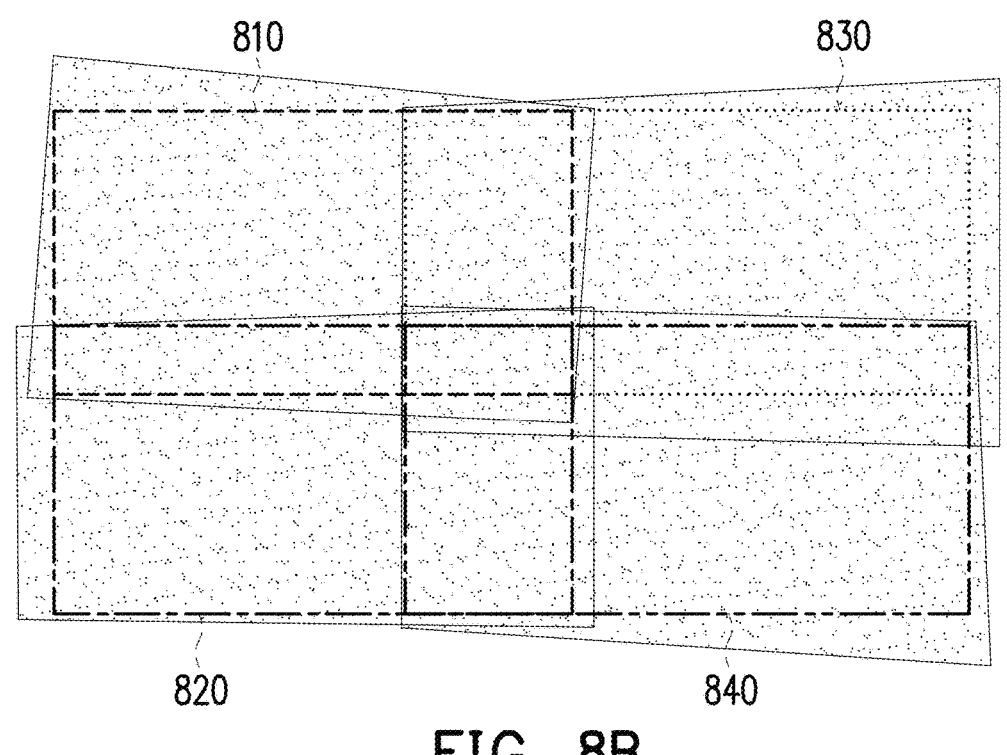
FIG. 8B is a schematic diagram of a projection area corresponding to each projection apparatus obtained from a full image boundary according to an embodiment of the disclosure.

For example, FIG. 8A is a schematic diagram of a full image boundary according to an embodiment of the disclosure. FIG. 8B is a schematic diagram of a projection area corresponding to each projection apparatus obtained from a full image boundary according to an embodiment of the disclosure.

The processor 110 calculates the minimum intersection area $A_{min}$ based on the coordinate information of the adjusted main bounding boxes 610 to 640 (based on the coordinate systems of the imaging apparatuses 140-1 to 140-4) so as to obtain the full image boundary 800. The fully image boundary 800 is corresponding to the minimum intersection area $A_{min}$.

After obtaining the full image boundary 800, the processor 110 calculates and respectively obtains the adjusted projection areas 810 to 840 corresponding to the projection apparatuses 140-1 to 140-4, and obtains the adjusted projection boundary coordinates corresponding to the projection areas 810 to 840 under the coordinate systems of the imaging apparatuses 140-1 to 140-4. Then, the processor 110 transforms the adjusted projection boundary coordinates to conform to the coordinate system of each of the projection apparatuses 130-1 to 130-4, and drives the projection apparatuses 130-1 to 130-4 to project so as to form the adjusted full image on the projection surface 300.

Figure 9A:
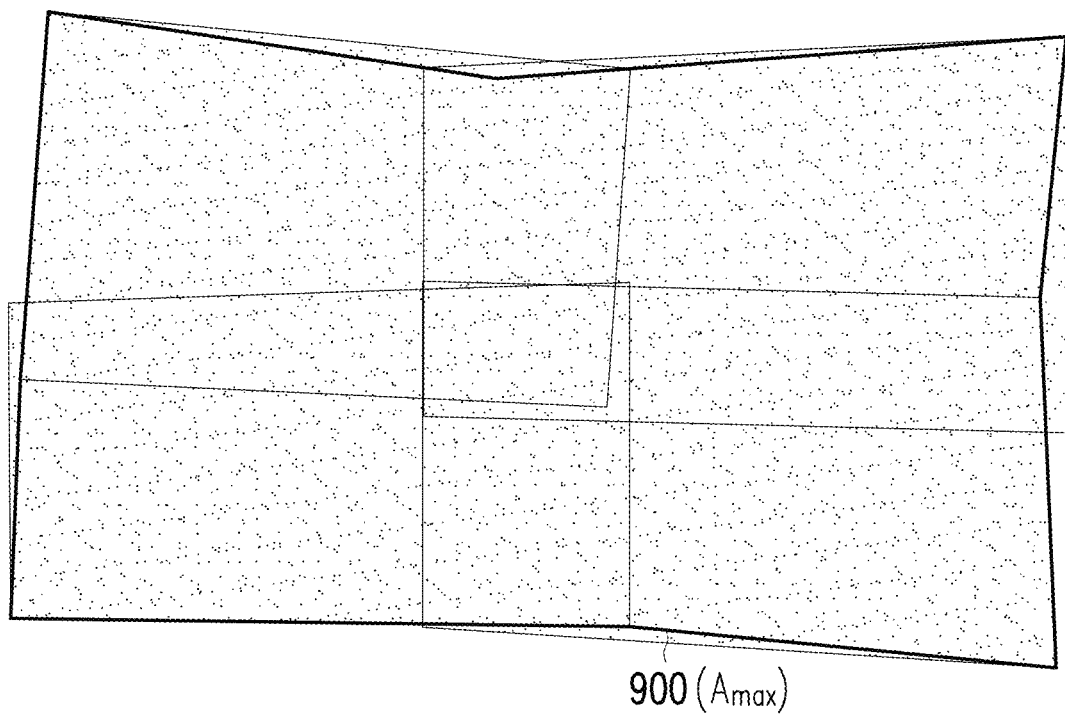
FIG. 9A is a schematic diagram of a full image boundary according to another embodiment of the disclosure.
Figure 9B:
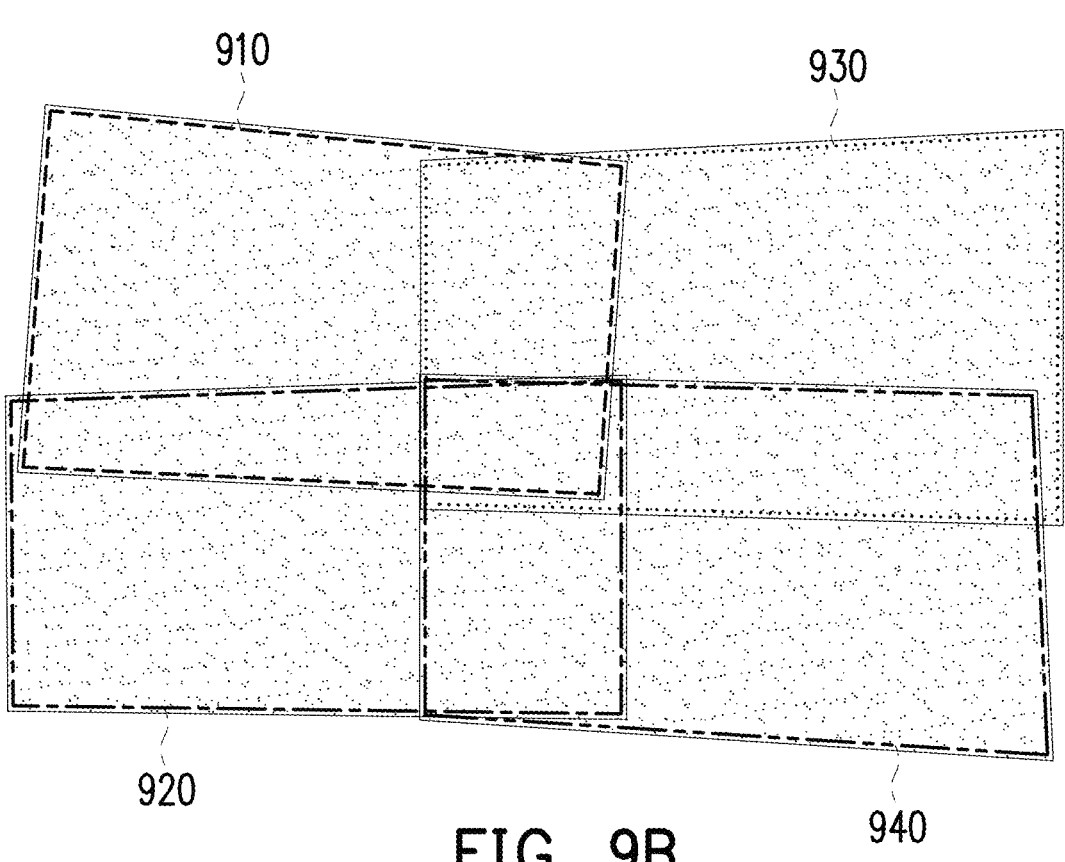
FIG. 9B is a schematic diagram of a projection area corresponding to each projection apparatus obtained from a full image boundary according to another embodiment of the disclosure.

FIG. 9A is a schematic diagram of a full image boundary according to another embodiment of the disclosure. FIG. 9B is a schematic diagram of a projection area corresponding to each projection apparatus obtained from a full image boundary according to another embodiment of the disclosure.

The processor 110 calculates the maximum intersection area $A_{max}$ based on the coordinate information of the adjusted main bounding boxes 610 to 640 (based on the coordinate systems of the imaging apparatuses 140-1 to 140-4) so as to obtain the full image boundary 900. The fully image boundary 900 is corresponding to the maximum intersection area $A_{max}$.

After obtaining the full image boundary 900, the processor 110 calculates and respectively obtains the adjusted projection areas 910 to 940 corresponding to the projection apparatuses 140-1 to 140-4, and obtains the adjusted projection boundary coordinates corresponding to the projection areas 910 to 940 under the coordinate systems of the imaging apparatuses 140-1 to 140-4. Then, the processor 110 transforms the adjusted projection boundary coordinates to conform to the coordinate system of each of the projection apparatuses 130-1 to 130-4, and drives the projection apparatuses 130-1 to 130-4 to project so as to form the adjusted full image on the projection surface 300.

Figure 10:
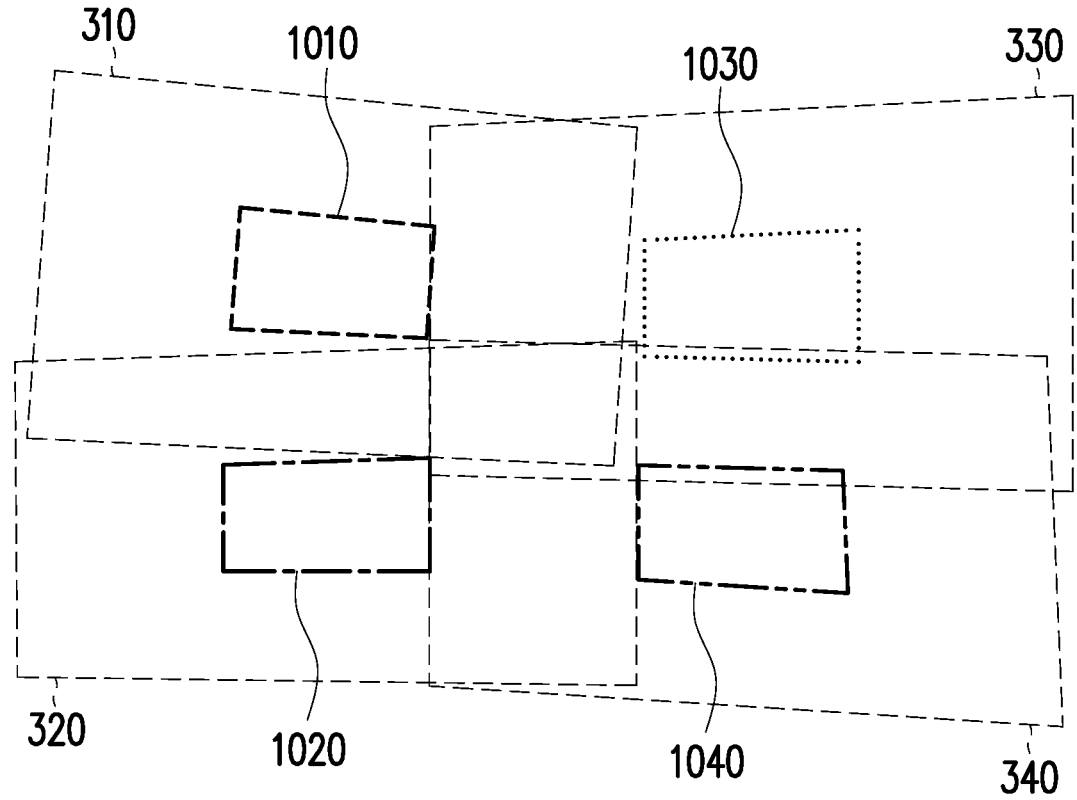
FIG. 10 is a schematic diagram of a projection state of each projection apparatus according to another embodiment of the disclosure.

In another embodiment, the initial bounding box corresponding to each of the projected images 310 to 340 may be set smaller than each projected image first so as to prevent the projected images 310 to 340 from exceeding the imaging ranges of the corresponding imaging apparatuses 140-1 to 140-4 and making it impossible to correctly align the boundary. FIG. 10 is a schematic diagram of a projection state of each projection apparatus according to another embodiment of the disclosure. Referring to FIG. 10, the processor 110 drives the projection apparatuses 130-1 to 130-4 to respectively project the projected images 310 to 340 and the corresponding initial bounding boxes 1010 to 1040 on the projection surface 300. In this embodiment, for the projected image 310, the main bounding box (corresponding to the initial bounding box 1010) of the projected image 310 can be adjusted according to the outer frames of the second projection boundary ranges corresponding to the other projected images 320 to 340 on the captured images. In another embodiment, the processor 110 drives the projection apparatuses 130-1 to 130-4 to respectively project the projected images 310 to 340, and the imaging apparatuses 140-1 to 140-4 are used to respectively perform the image capture on the projected images 310 to 340 projected by the projection apparatuses 130-1 to 130-4 and the surrounding areas of the projected images so as to obtain the captured images; and the processor 110 controls the captured image displayed on the display 120 to display the main bounding box corresponding to the projected image and to display the reference bounding box corresponding to at least a part of the another projected image in the surrounding area, wherein the main bounding box is smaller than each projected image.

The boundary range of each projected image may be the projection range of the apparatus or the edge of the adjacent projected image, or the adjusted position of the reference bounding box corresponding to aligned adjacent projection apparatuses. For example, there are two types of boundary ranges: when the projected image of the apparatus is smaller than the adjacent projected image, the boundary range is equal to the projection range of the apparatus; and when the projected image of the apparatus is larger than the adjacent projected image, the boundary range is set to the boundary of the adjacent projected image.

In summary, according to the disclosure, in the captured image of each imaging apparatus, the boundary of the projection apparatus is adjusted independently by taking the boundary of the projected image of a projection apparatus adjacent to the projection apparatus as a basis for alignment, so as to calculate and obtain the full image boundary. Accordingly, it is possible to improve the situation that the boundary edges of the full image formed by multiple projected images of multiple projection apparatuses are not aligned and have discontinuous boundary lines. Furthermore, a roughly aligned full image projection boundary can be adjusted in advance through the above-mentioned projected image adjusting method to be used as the coordinate data for boundary setting in the subsequent automatic image blending, which reduces the data processing time of the subsequent automatic image blending.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for adjusting a projection boundary, performed by a processor, comprising steps of:

driving a plurality of projection apparatuses to respectively project respective projected images on different positions of a projection surface to form a full image;

in response to projecting the projected images on the projection surface, driving a plurality of imaging apparatuses corresponding to the plurality of projection apparatuses and using each of the imaging apparatuses to obtain a corresponding captured image by capturing the projected image projected by corresponding one of the projection apparatus and a surrounding area of the projected image, wherein the surrounding area of the projected image comprises at least a part of another of the projected images projected by another of the projection apparatuses;

displaying all captured images from the imaging apparatuses on a display, and respectively displaying a main bounding box corresponding to the projected image on each of the captured images and displaying a reference bounding box corresponding to at least a part of the another of the projected images in the surrounding area on each of the captured images;

independently adjusting the main bounding box of each of the captured images relative to the reference bounding box to obtain an adjusted main bounding box corresponding to each of the captured images;

calculating a full image boundary based on respective adjusted main bounding boxes of the captured images; and driving the projection apparatuses to project an adjusted full image based on the full image boundary, wherein the step of calculating the full image boundary based on the respective adjusted main bounding boxes of the captured images comprises:

calculating coordinate information of the respective adjusted main bounding boxes of the captured images obtained by the imaging apparatuses to obtain a minimum intersection area, and using an outer frame of the minimum intersection area as the full image boundary; or calculating coordinate information of the respective adjusted main bounding boxes of the captured images to obtain a maximum intersection area, and using an outer frame of the maximum intersection area as the full image boundary.

2. The method for adjusting a projection boundary according to claim 1, wherein a first projection apparatus among the projection apparatuses corresponds to a first imaging apparatus of the imaging apparatuses, and the first projection apparatus is configured to project a first projected image, wherein the step of respectively displaying the main bounding box corresponding to the projected image on each of the captured images comprises:

calculating a first projection boundary range in which the first projected image is presented on the captured image; and displaying the main bounding box within the first projection boundary range.

3. The method for adjusting a projection boundary according to claim 1, wherein the step of displaying the reference bounding box corresponding to at least a part of the another of the projected images in the surrounding area on each of the captured images comprises:

calculating a second projection boundary range corresponding to the surrounding area, which is adjacent to the first projected image; and displaying the reference bounding box within the second projection boundary range.

4. The method for adjusting a projection boundary according to claim 2, wherein the step of independently adjusting the main bounding box of each of the captured images relative to the reference bounding box comprises:

adjusting at least one side of the main bounding box to align with at least one side of the reference bounding box in a manner that the main bounding box does not exceed the first projection boundary range.

5. The method for adjusting a projection boundary according to claim 1, wherein the step of driving the projection apparatuses to respectively project the respective projected images on different positions of the projection surface comprises:

projecting an initial bounding box corresponding to each of the projected images while driving the projection apparatuses to respectively project the respective projected images on different positions of the projection surface, wherein each of the imaging apparatuses captures the initial bounding box projected within an imaging range to present the main bounding box and the reference bounding box on the captured image.

6. The method for adjusting a projection boundary according to claim 1, wherein after respectively displaying the main bounding box corresponding to the projected image on each of the captured images, the method further comprises step of:

providing a plurality of control points on the main bounding box of the captured image, and obtaining the adjusted main bounding box by moving at least one of the control points.

7. The method for adjusting a projection boundary according to claim 6, wherein moving at least one of the control points comprises:

moving at least one of the control points onto the reference bounding box on the captured image.

8. The method for adjusting a projection boundary according to claim 1, wherein the step of driving the projection apparatuses to project the adjusted full image based on the full image boundary comprises:

obtaining adjusted projection boundary coordinates corresponding to each of the projection apparatuses under the full image boundary; and transforming the adjusted projection boundary coordinates to conform to a coordinate system of each of the projection apparatuses, and driving each of the projection apparatuses to project the adjusted full image on the projection surface.

9. A projection system, comprising a plurality of projection apparatuses, a plurality of imaging apparatuses, a display, and a processor, wherein the projection apparatuses are coupled to the processor, and the projection apparatuses are driven by the processor to respectively project respective projected images on different positions of a projection surface to form a full image;

the imaging apparatuses are respectively disposed corresponding to the projection apparatuses and are coupled to the processor, and the imaging apparatuses are driven by the processor to enable each of the imaging apparatuses to obtain a corresponding captured image by capturing the projected image projected by corresponding one of the projection apparatus and a surrounding area of the projected image, wherein the surrounding area of the projected image comprises at least a part of another of the projected images projected by another of the projection apparatuses;

the display is coupled to the processor, and the processor receives all captured images from the imaging apparatuses and transmits the captured images to the display to display the captured images;

wherein the processor is configured to:

respectively display a main bounding box corresponding to the projected image on each of the captured images and display a reference bounding box corresponding to at least a part of the another of the projected images in the surrounding area on each of the captured images;

independently adjust the main bounding box of each of the captured images relative to the reference bounding box to obtain an adjusted main bounding box corresponding to each of the captured images;

calculate a full image boundary based on respective adjusted main bounding boxes of the captured images; and drive the projection apparatuses to project an adjusted full image based on the full image boundary, wherein the processor is configured to:

calculate coordinate information of the respective adjusted main bounding boxes of the captured images obtained by the imaging apparatuses to obtain a minimum intersection area, and use an outer frame of the minimum intersection area as the full image boundary; or calculate coordinate information of the respective adjusted main bounding boxes of the captured images to obtain a maximum intersection area, and use an outer frame of the maximum intersection area as the full image boundary.

10. The projection system according to claim 9, wherein a first projection apparatus among the projection apparatuses corresponds to a first imaging apparatus of the imaging apparatuses, the first projection apparatus is configured to project a first projected image, and the processor is configured to calculate a first projection boundary range in which the first projected image is presented on the captured image; and display the main bounding box within the first projection boundary range by the display.

11. The projection system according to claim 10, wherein the processor is configured to calculate a second projection boundary range corresponding to the surrounding area, which is adjacent to the first projected image, and display the reference bounding box within the second projection boundary range by the display.

12. The projection system according to claim 9, wherein the processor is configured to:

project an initial bounding box corresponding to each of the projected images while driving the projection apparatuses to respectively project the respective projected images on different positions of the projection surface, wherein each of the imaging apparatuses captures the initial bounding box projected within an imaging range to present the main bounding box and the reference bounding box on the captured image.

13. The projection system according to claim 10, wherein the processor is configured to adjust at least one side of the main bounding box to align with at least one side of the reference bounding box by the display in a manner that the main bounding box does not exceed the first projection boundary range.

14. The projection system according to claim 9, wherein the processor is configured to:

provide a plurality of control points on the main bounding box of the captured image, and obtain the adjusted main bounding box by moving at least one of the control points.

15. The projection system according to claim 14, wherein the processor is configured to:

move at least one of the control points onto the reference bounding box on the captured image.

16. The projection system according to claim 9, wherein the processor is configured to:

obtain adjusted projection boundary coordinates corresponding to each of the projection apparatuses under the full image boundary; and transform the adjusted projection boundary coordinates to conform to a coordinate system of each of the projection apparatuses, and drive each of the projection apparatuses to project the adjusted full image on the projection surface.

\* \* \* \* \*